(12) United States Patent
Chang et al.

(10) Patent No.: US 8,982,119 B2
(45) Date of Patent: Mar. 17, 2015

(54) ELECTRONIC DEVICE AND METHOD FOR ESTABLISHING A SAFETY PLANE IN COORDINATE MEASUREMENTS

(75) Inventors: Chih-Kuang Chang, New Taipei (TW); Xin-Yuan Wu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 439 days.

(21) Appl. No.: 13/449,294

(22) Filed: Apr. 17, 2012

(65) Prior Publication Data

US 2012/0330602 A1  Dec. 27, 2012

(30) Foreign Application Priority Data

Jun. 22, 2011  (CN) .......................... 2011 1 0169295

(51) Int. Cl.
  *G06T 17/00* (2006.01)
  *G01C 9/00* (2006.01)
  *G01B 5/008* (2006.01)
  *G01B 21/04* (2006.01)

(52) U.S. Cl.
  CPC .............. *G01B 5/008* (2013.01); *G01B 21/047* (2013.01)
  USPC .......................................... 345/420; 702/150

(58) Field of Classification Search
  None
  See application file for complete search history.

(56) References Cited

U.S. PATENT DOCUMENTS

| | | | |
|---|---|---|---|
| 2007/0144023 A1* | 6/2007 | Chang et al. | 33/503 |
| 2007/0165025 A1* | 7/2007 | Shen et al. | 345/423 |
| 2009/0033660 A1* | 2/2009 | Levene et al. | 345/424 |
| 2010/0268355 A1* | 10/2010 | Chang et al. | 700/66 |

* cited by examiner

*Primary Examiner* — Kee M Tung
*Assistant Examiner* — Frank Chen
(74) *Attorney, Agent, or Firm* — Novak Druce Connolly Bove + Quigg LLP

(57) ABSTRACT

In a method for establishing a safety plane in coordinate measurements, the method meshes a 3D model of a workpiece and a probe by triangles, and calculates a maximum bounding box of the probe. The method further obtains a moving path of the maximum bounding box after moving the maximum bounding box from a first measuring point to a second, and obtains a maximum space box of the moving path. If the maximum space box has one or more intersections with the workpiece, the method calculates a distance between vertices of each of the triangles falling within the maximum space box and a bottom face of the maximum space box, and obtains a point in the bottom face of the maximum space box that has a maximum distance from the triangles. By correcting a plane containing the point, the safety plane is obtained.

18 Claims, 10 Drawing Sheets

ELECTRONIC DEVICE AND METHOD FOR ESTABLISHING A SAFETY PLANE IN COORDINATE MEASUREMENTS

BACKGROUND

1. Technical Field

Embodiments of the present disclosure generally relate to coordinate measurement methods, and more particularly to an electronic device, a storage medium and a method for establishing a safety plane in coordinate measurements.

2. Description of Related Art

In automated processes, workpieces on a production line should be carefully measured to ensure that all dimensions of the workpieces are within predetermined tolerances. This process may be automated using a measuring device with a probe to check several points of the workpieces. To avoid collisions of the probe on the workpiece, a safety plane may be firstly established. As illustrated in FIG. 1, the safety plane is a plane for enabling the probe to measure the workpiece while avoiding the collisions. Once the probe is required to contact a measuring point of the workpiece, the probe can be first moved from a current point to the safety plane, and then slid from the safety plane to the measuring point. However, current safety planes are established manually, and much additional work is needed because the probe is required to move on the safety plane before measuring the measuring point, which is a costly use of time. Furthermore, the safety plane established by a person may not be precise. Therefore, an improved establishing method is desirable to address the aforementioned issues.

DETAILED DESCRIPTION

In general, the term "module," as used herein, refers to logic embodied in hardware or firmware, or to a collection of software instructions, written in a programming language, such as, for example, Java, C, or assembly. One or more software instructions in the modules may be embedded in firmware, such as in an EPROM. It will be appreciated that modules may comprise connected logic units, such as gates and flip-flops, and may comprise programmable units, such as programmable gate arrays or processors. The modules described herein may be implemented as either software and/ or hardware modules and may be stored in any type of non-transitory computer-readable medium or computer storage device.

Figure 2:
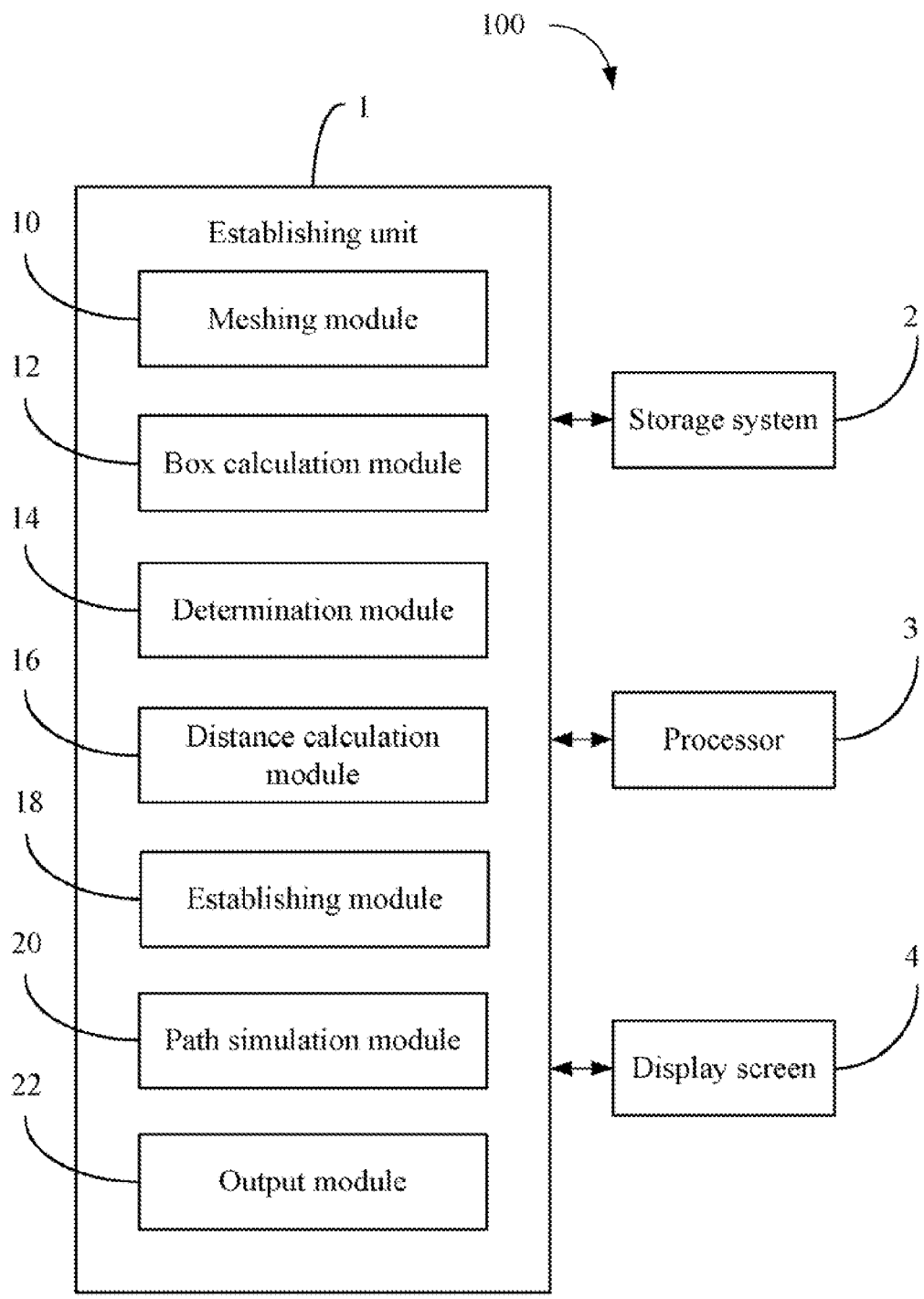
FIG. 2 is a block diagram of one embodiment of an electronic device including a establishing unit.

FIG. 2 is a block diagram of one embodiment of an electronic device 100 including an establishing unit 1. The electronic device 100 further includes a storage system 2, at least one processor 3, and a display screen 4. In one embodiment, the electronic device 100 may be a computer, a server, a portable electronic device, or any other electronic device. Functions of the establishing unit 1 are implemented by the electronic device 100. The establishing unit 1 may be a software program stored in the storage system 2 and executed by the processor 3.

In one embodiment, the storage system 2 may be a magnetic or an optical storage system, such as a hard disk drive, an optical drive, a compact disc, a digital video disc, a tape drive, or other suitable storage medium. The processor 3 may be a central processing unit including a math co-processor, for example.

In one embodiment, the establishing unit 1 includes a meshing module 10, a box calculation module 12, a determination module 14, a distance calculation module 16, an establishing module 18, a path simulation module 20, and an output module 22. Each of the modules 10-22 may be a software program including one or more computerized instructions that are stored in the storage system 2 and executed by the processor 3.

The meshing module 10 meshes a 3D model of a workpiece (e.g., a phone shell, a motherboard) and a probe using a plurality of triangles, and outputs a record list that includes information and details of the plurality of triangles. In the embodiment, the 3D model includes a graphic of the workpiece and a graphic of the probe. In the 3D model, the probe is used for measuring the workpiece. The plurality of triangles include triangles of the workpiece, and triangles of the probe. Details of meshing the 3D model are described in FIG. 5.

The box calculation module 12 calculates a maximum bounding box of the probe according to the triangles of the probe, moving the maximum bounding box from a first measuring point to a second measuring point, and obtains a moving path of the maximum bounding box. The box calculation module 12 further obtains a maximum space box of the moving path based on coordinate values of the first measuring point and the second measuring point. Details of obtaining the maximum bounding box and the maximum space box are described in FIG. 7 and FIG. 9. In the embodiment, the maximum bounding box is a cubic box that just can enclose a graphic of the probe. The space box is a cubic box for indicating the moving path of the maximum bounding box.

The determination module 14 determines whether any triangles of the workpiece fall within the maximum space box. Details of the determination is described in FIG. 10.

If any triangles of the workpiece fall within the maximum space box, the distance calculation module 16 calculates a distance between vertices of each of the triangles that fall within the maximum space box and a bottom face of the maximum space box, and obtains a point (such as the point "M" shown in FIG. 4) in the bottom face of the maximum space box that has a maximum distance from the triangles.

Figure 4:
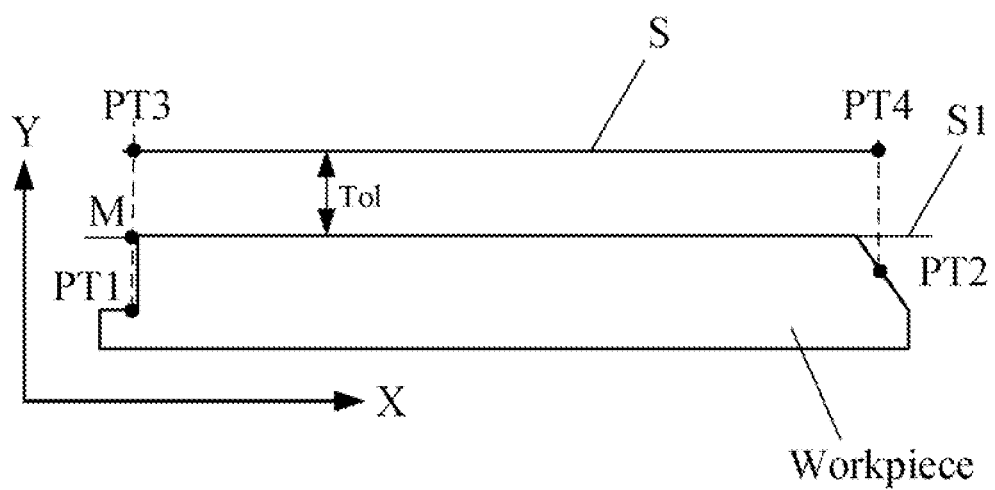
FIG. 4 illustrates an example of establishing a safety plane.

According to the point "M," the establishing module 18 can obtain a plane containing the point, such as the plane "S1" shown in FIG. 4. In order to precisely obtain the safety plane, the establishing module 18 may correct the plane "S1" according to a predetermined tolerance (such as "Tol" in FIG.

4), and obtain the safety plane "S" after the correction. In one embodiment, the tolerance is a tolerance of the safety plane predetermined by an operator.

The path simulation module 20 projects the first measuring point and the second measuring point on the safety plane, obtains a first projection point and a second projection point, and simulates a measuring path of the probe based on the first measuring point, the second measuring point, the first projection point, and the second projection point. In details, the path simulation module 20 projects the first measuring point on the safety plane and obtains the first projection point. The path simulation module 20 projects the second measuring point on the safety plane to obtain the second projection point. In the embodiment, the measuring path includes three lines: a first line composed by the first measuring point and the first projection point, a second line composed by the first projection point and the second projection point, and a third line composed by the second projection point and the second measuring point.

The output module 22 displays the measuring path on the display screen 4. In the embodiment, the display screen 4 displays the 3D model of the workpiece and the probe, and further displays the measuring path during establishing the safety plane.

Figure 1:
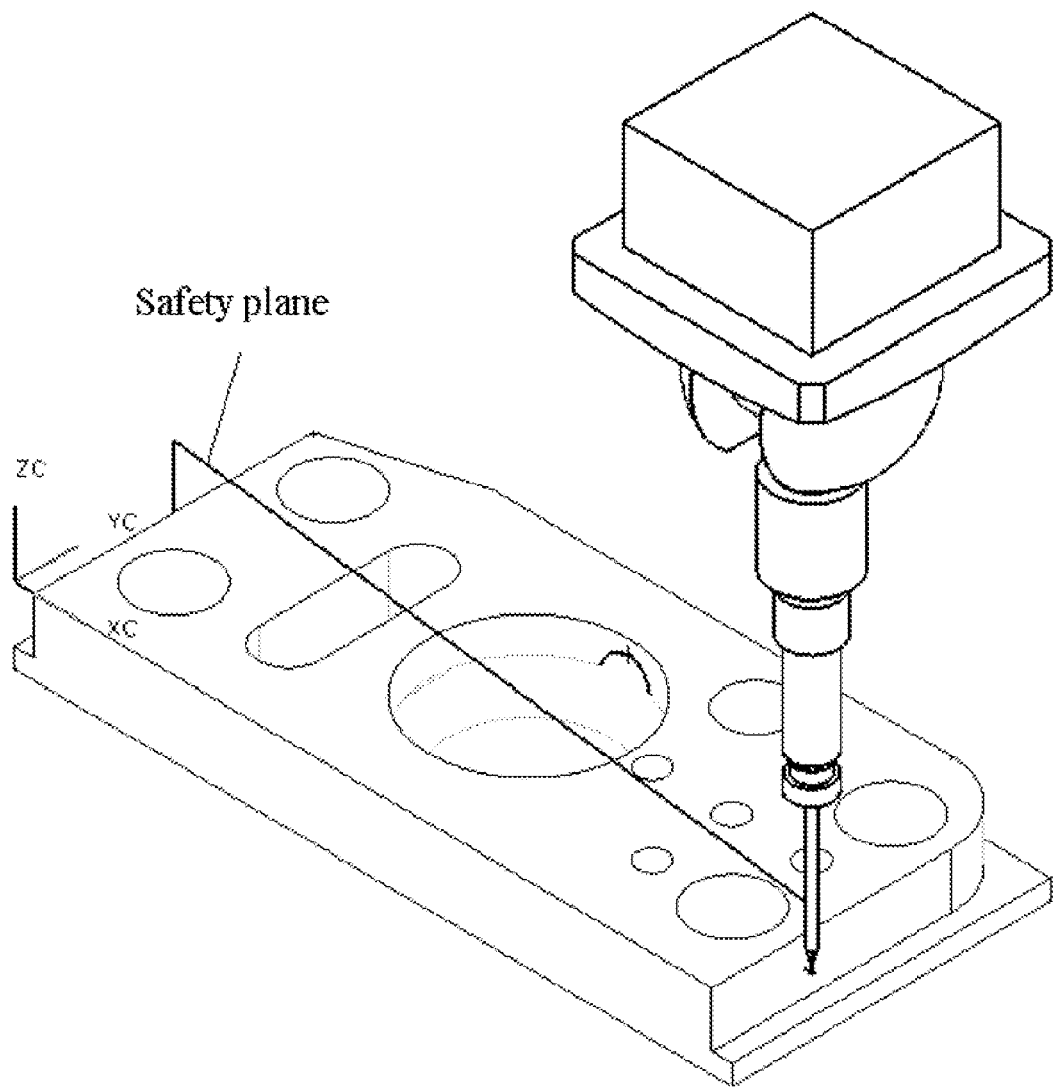
FIG. 1 illustrates an example of a safety plane established in coordinate measurements.
Figure 3:
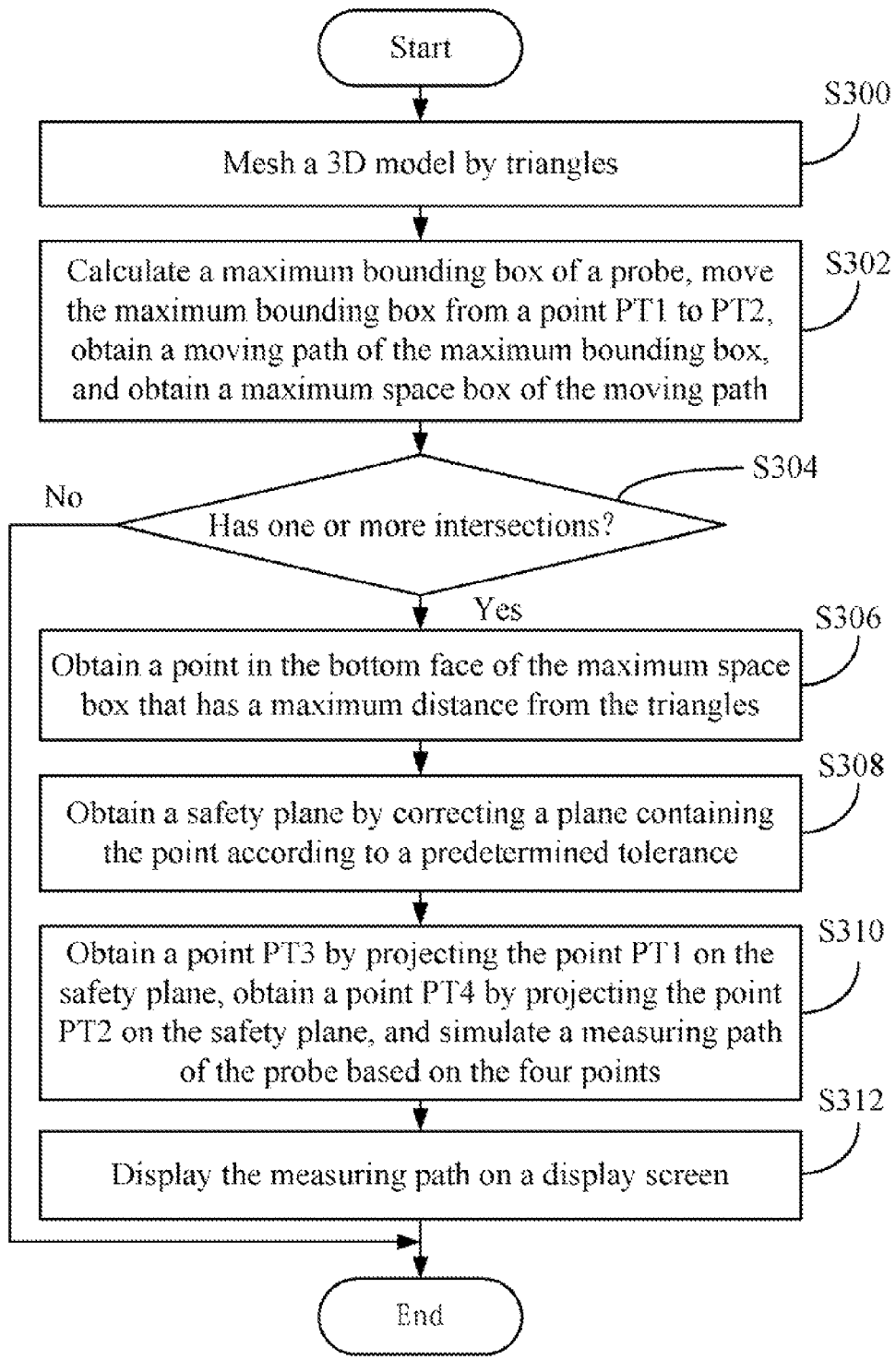
FIG. 3 is a flowchart illustrating one embodiment of a method for establishing a safety plane using the electronic device of FIG. 1.

FIG. 3 is a flowchart illustrating one embodiment of a method for establishing a safety plane using the electronic device of FIG. 1. Depending on the embodiment, additional blocks may be added, others removed, and the ordering of the blocks may be changed.

In step S300, the meshing module 10 meshes a 3D model of a workpiece and a probe by a plurality of triangles, and outputs a record list comprising information and details of the plurality of triangles. In the embodiment, the 3D model includes a graphics of the workpiece and a graphics of the probe. In the 3D model, the probe is used for measuring the workpiece. Details of meshing the 3D model are described in FIG. 5.

In step S302, the box calculation module 12 obtains the triangles related to the probe from the record list, and calculates a maximum bounding box of the probe according to coordinate values the triangles. The box calculation module 12 further moves the maximum bounding box from a first measuring point (such as the point "PT1" shown in FIG. 4) to a second measuring point (such as the point "PT2" shown in FIG. 4), obtains a moving path of the maximum bounding box, and obtains a maximum space box of the moving path based on coordinate values of the first measuring point and the second measuring point. Details of obtaining the maximum bounding box and the maximum space box of the moving path are described in FIG. 7 and FIG. 9.

In block S304, the determination module 14 determines whether the maximum space box has one or more intersections with the 3D model of the workpiece by detecting whether any triangles of the workpiece fall within the maximum space box. Details of the determination step is described in FIG. 10. If the maximum space box has no intersection with the 3D model of the workpiece, the flow ends. If the maximum space box has one or more intersections with the 3D model of the workpiece, step S306 is implemented.

In block S306, the distance calculation module 16 calculates a distance between vertices of each of the triangles that falls within the maximum space box and a bottom face of the maximum space box, and obtains a point (such as the point "M" shown in FIG. 4) in the bottom face of the maximum space box that has a maximum distance from the triangles.

In step S308, the establishing module 18 obtains a plane containing the point (such as the plane "S1" shown in FIG. 4), corrects the plane "S1" based on a predetermined tolerance (such as "Tol" in FIG. 4), and obtains the safety plane "S" after correcting the plane "S1."

In step S310, the path simulation module 20 obtains the first projection point by projecting the first measuring point on the safety plane, and obtains the second projection point by projecting the second measuring point on the safety plane. The path simulation module 20 further simulates a measuring path of the probe based on the first measuring point, the second measuring point, the first projection point, and the second projection point. In the embodiment, the measuring path includes three lines: a first line composed by the first measuring point and the first projection point, a second line composed by the first projection point and the second projection point, and a third line composed by the second projection point and the second measuring point.

In step S312, the output module 22 displays the measuring path on the display screen 4 during establishing the safety plane.

Figure 5:
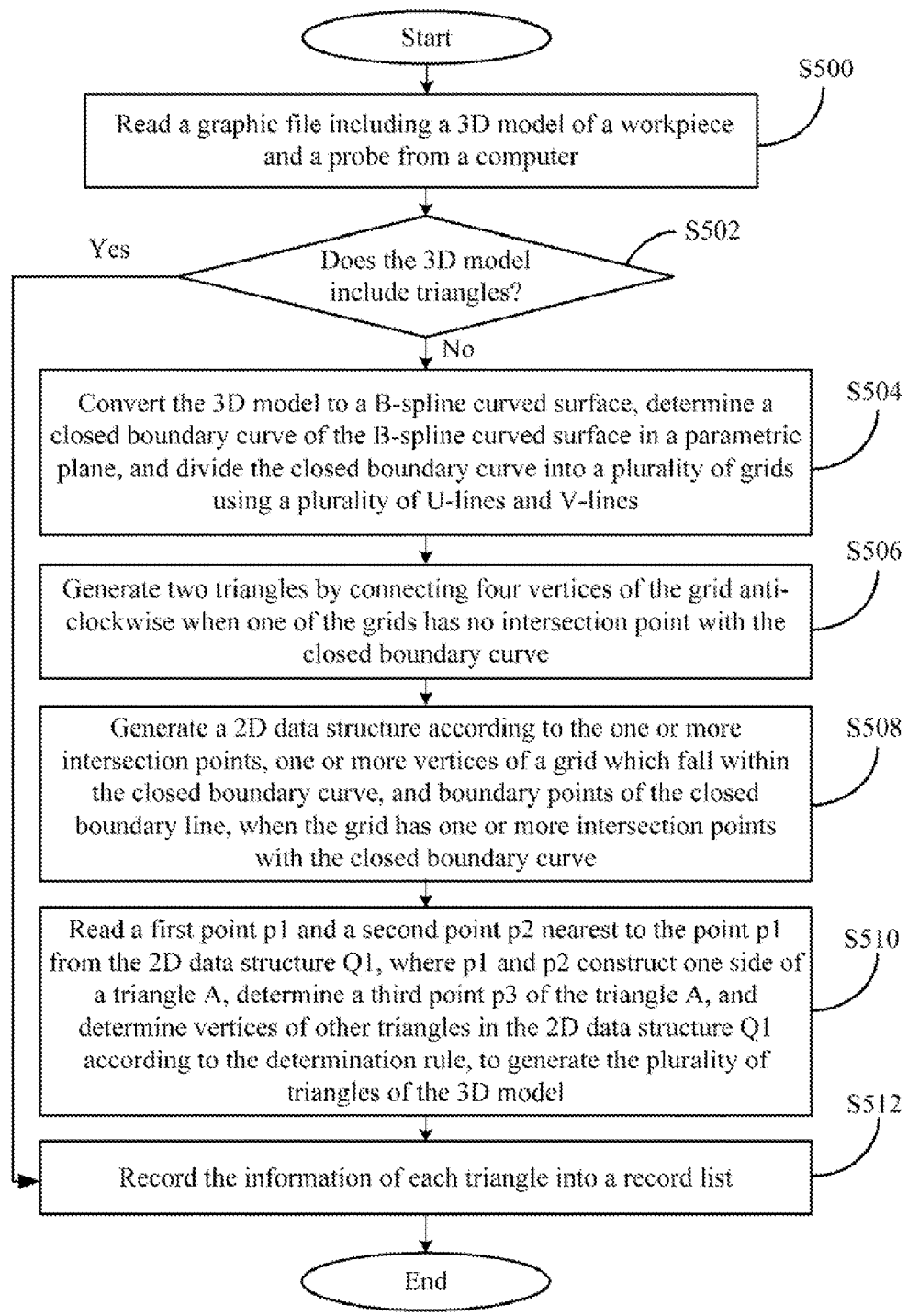
FIG. 5 is a detailed description of step S300 in FIG. 3, for meshing a 3D model of a workpiece and a probe.

FIG. 5 is a detailed description of step S300 in FIG. 3, for meshing a 3D model of the workpiece and the probe.

In block S500, the meshing module 10 reads a graphic file from the storage system 2 of the computer 100. In the embodiment, the graphic file is a file for storing the 3D model of the workpiece and the probe, and is stored in the storage system 2.

In block S502, the meshing module 10 determines whether the 3D model includes one or more triangles. If the 3D model includes triangles, the procedure directly goes to S512. Otherwise, if the 3D model does not include triangles, the procedure goes to block S504.

In block S504, the meshing module 10 converts the 3D model to a B-spline curved surface, and determines a closed boundary curve of the B-spline curved surface in a parametric plane. The meshing module 10 further divides the closed boundary curve into a plurality of grids (as shown in FIG. 6) using a plurality of horizontal lines (hereinafter referred to "U-lines") and vertical lines (hereinafter referred to "V-lines").

In block S506, the meshing module 10 generates two triangles by connecting four vertices of the grid anti-clockwise when one of the grids has no intersection point with the closed boundary curve. For example, four vertices "P," "Q," "I," and "O" of a grid all fall within the closed boundary curve L1, then the meshing module 10 generates two triangles "OQP" and "OIQ" by connecting the four vertices "P," "Q," "I," and "O" in an anticlockwise. In another embodiment, the meshing module 10 can connect the four vertices of the grid in a clockwise direction.

Figure 6:
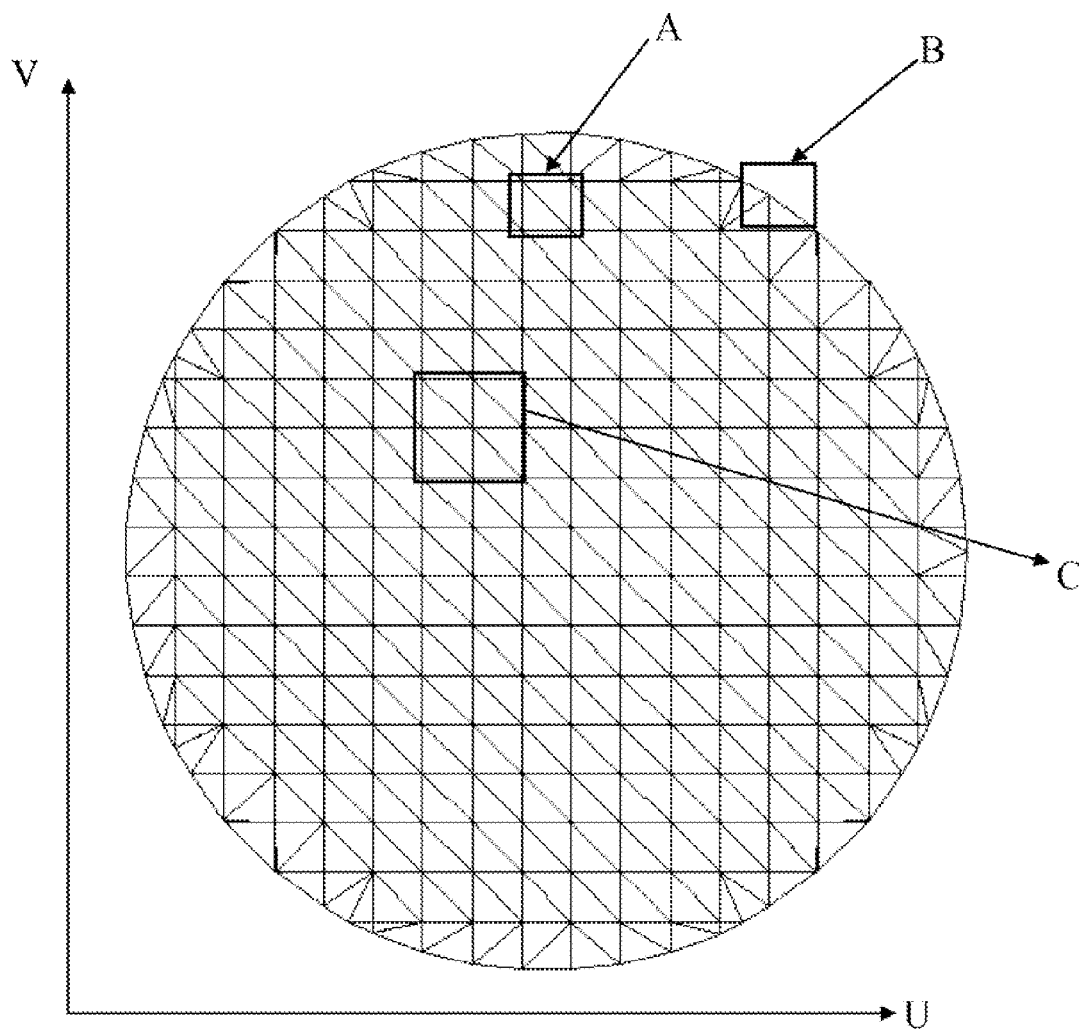
FIG. 6 illustrates an example of meshing the 3D model in FIG. 5 by a plurality of triangles.

In block S508, the meshing module 10 generates a two-dimensional (2D) data structure Q1 according to the one or more intersection points, one or more vertices of a grid which fall within the closed boundary curve, and boundary points of the closed boundary line, when the grid has one or more intersection points with the closed boundary curve (i.e., boxes "A" and "C" in FIG. 6).

In block S510, the meshing module 10 reads a first point p1 and a second point p2 nearest to the point p1 from the 2D data structure Q1, where p1 and p2 construct one side of a triangle A (i.e., box "B" in FIG. 6). The meshing module 10 further determines a third point p3 of the triangle A according to a determination rule that there is no 2D point of the 2D data structure Q1 in a circumcircle of the triangle A consisting of the points p1, p2, and p3, and determines vertices of other triangles in the 2D data structure Q1 according to the determination rule, to generate the plurality of triangles of the 3D model.

In block S512, the meshing module 10 records the information of each triangle into a record list T according to a sequence of generating the triangles. The record list T is stored in the storage system 2.

Figure 7:
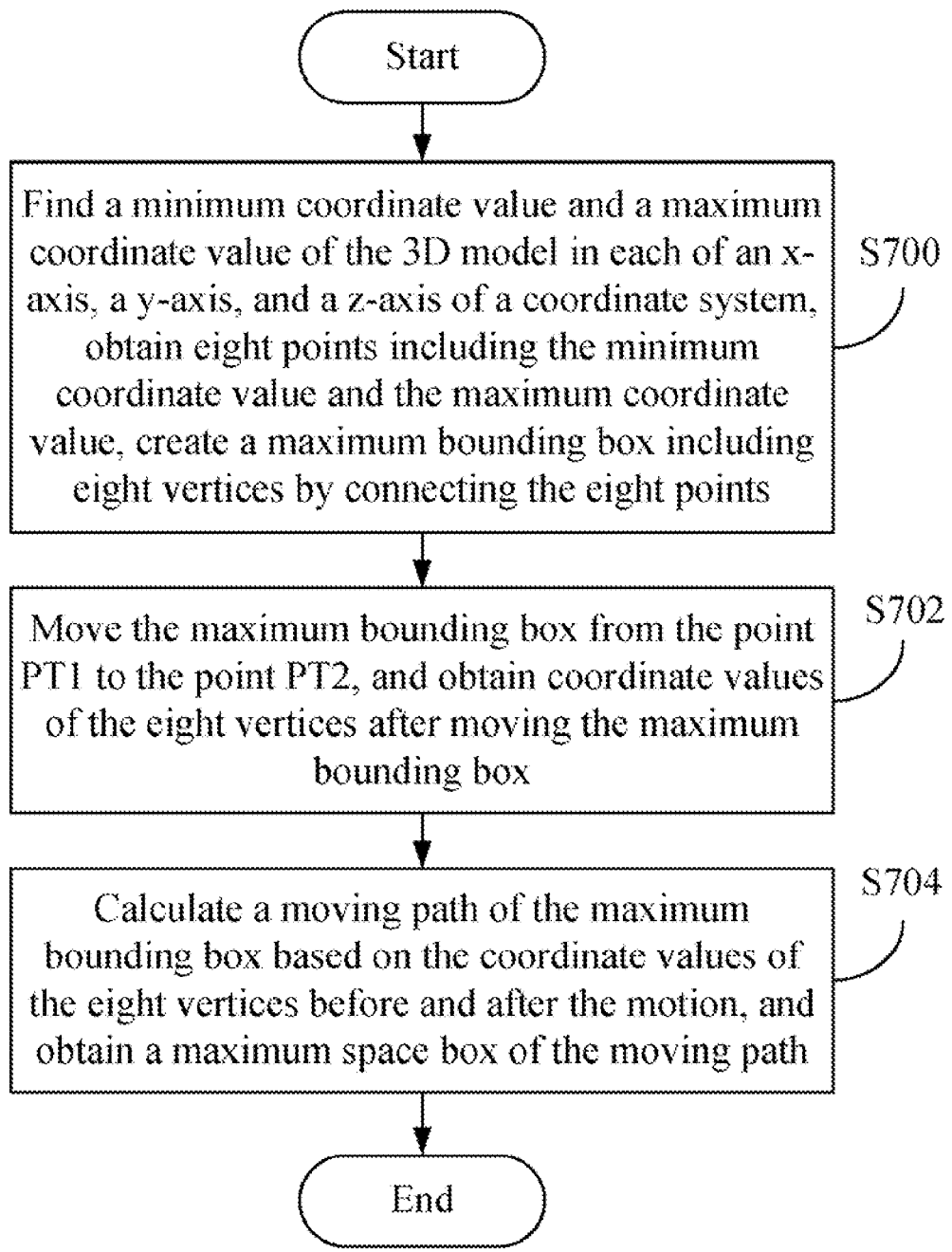
FIG. 7 is a detailed description of step S302 in FIG. 3, for obtaining a maximum space box.

FIG. 7 is a detailed description of step S302 in FIG. 3, for obtaining a maximum space box.

In step S700, the box calculation module 12 finds a minimum coordinate value and a maximum coordinate value of the 3D model in each of an x-axis, a y-axis, and a z-axis of a coordinate system, obtains eight points including the minimum coordinate value and the maximum coordinate value, creates a cube figure of the probe by connecting the eight points, and determines that the cube figure is the maximum bounding box including eight vertices.

Figure 8:
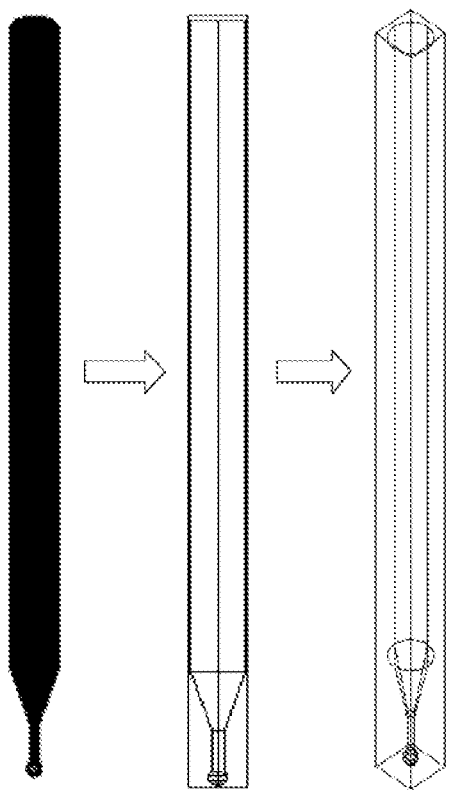
FIG. 8 illustrates an example of a maximum bounding box.

As illustrated in FIG. 8, the maximum bounding box has an upper surface and a bottom surface. The upper surface has four vertices, coordinate values of the four vertices include: (ptMin.x, ptMin.y, ptMax.z), (ptMin.x, ptMax.y, ptMax.z), (ptMax.x, ptMax.y, ptMax.z), and (ptMax.x, ptMin.y, ptMax.z). The bottom surface also has four vertices, coordinate values of the four vertices include: (ptMin.x, ptMin.y, ptMin.z), (ptMin.x, ptMax.y, ptMin.z), (ptMax.x, ptMax.y, ptMin.z), and (ptMax.x, ptMin.y, ptMin.z).

Figure 9:
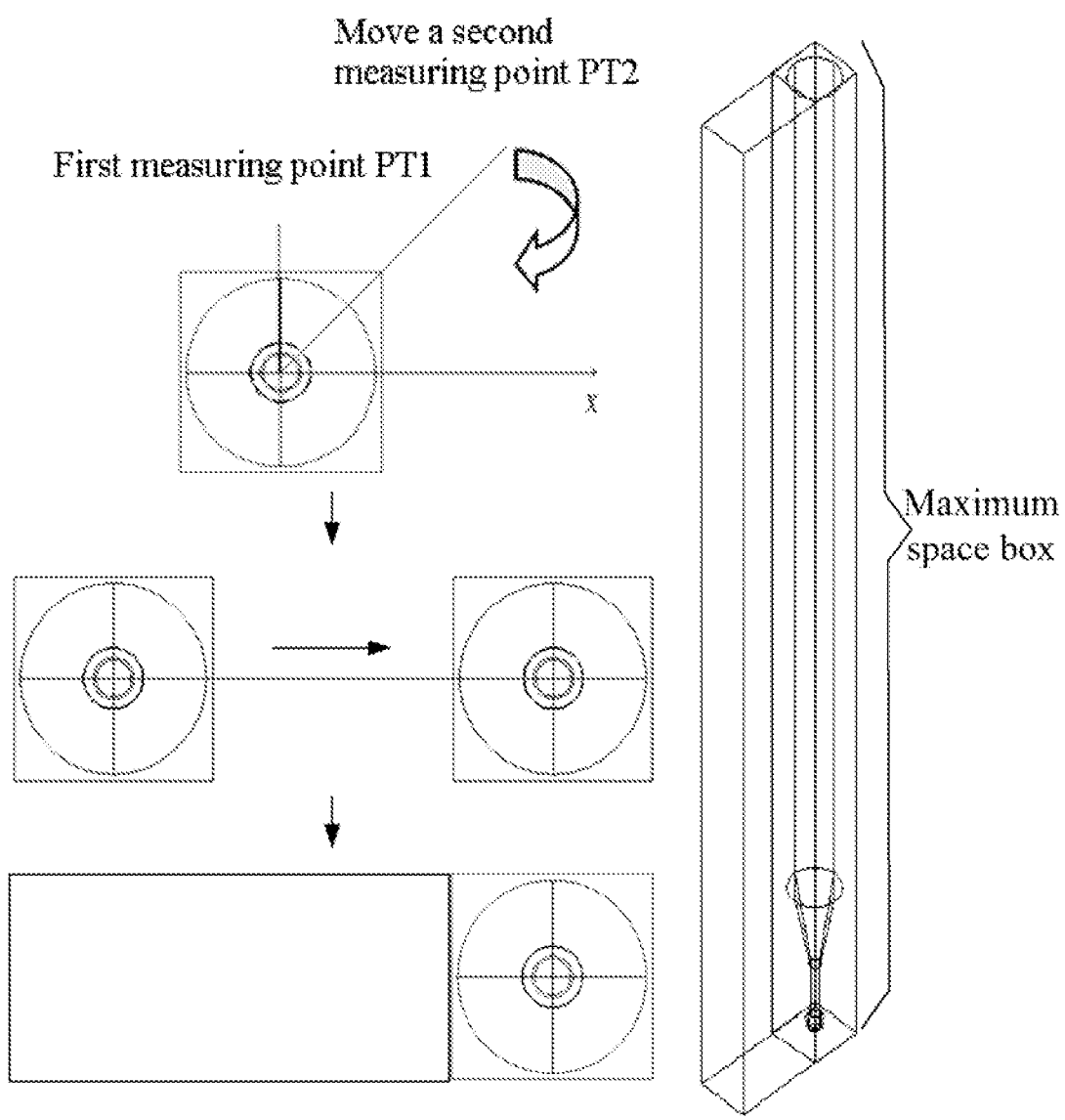
FIG. 9 illustrates an example of a maximum space box of a moving path of the maximum bounding box in FIG. 8.

In step S702, the box calculation module 12 moves the maximum bounding box from the first measuring point "PT1" to the second measuring point "PT2" by considering the first measuring point "PT1" as an origin point, and the positive direction of the x-axis as the moving direction, and obtains coordinate values of the eight vertices after moving the maximum bounding box. As shown in FIG. 9, the box calculation module 12 moves the second measuring point "PT2" to the x-axis for a length, and then moves the maximum bounding box from the first measuring point "PT1" to the second measuring point "PT2" that is in the x-axis. The length is equal to a distance between the first measuring point "PT1" and the second measuring point "PT2".

In step S704, the box calculation module 12 calculates a moving path of the maximum bounding box based on the coordinate values of the eight vertices before and after the motion, and obtains a maximum space box of the moving path according to the coordinate values. The maximum space box is shown in FIG. 9.

Figure 10:
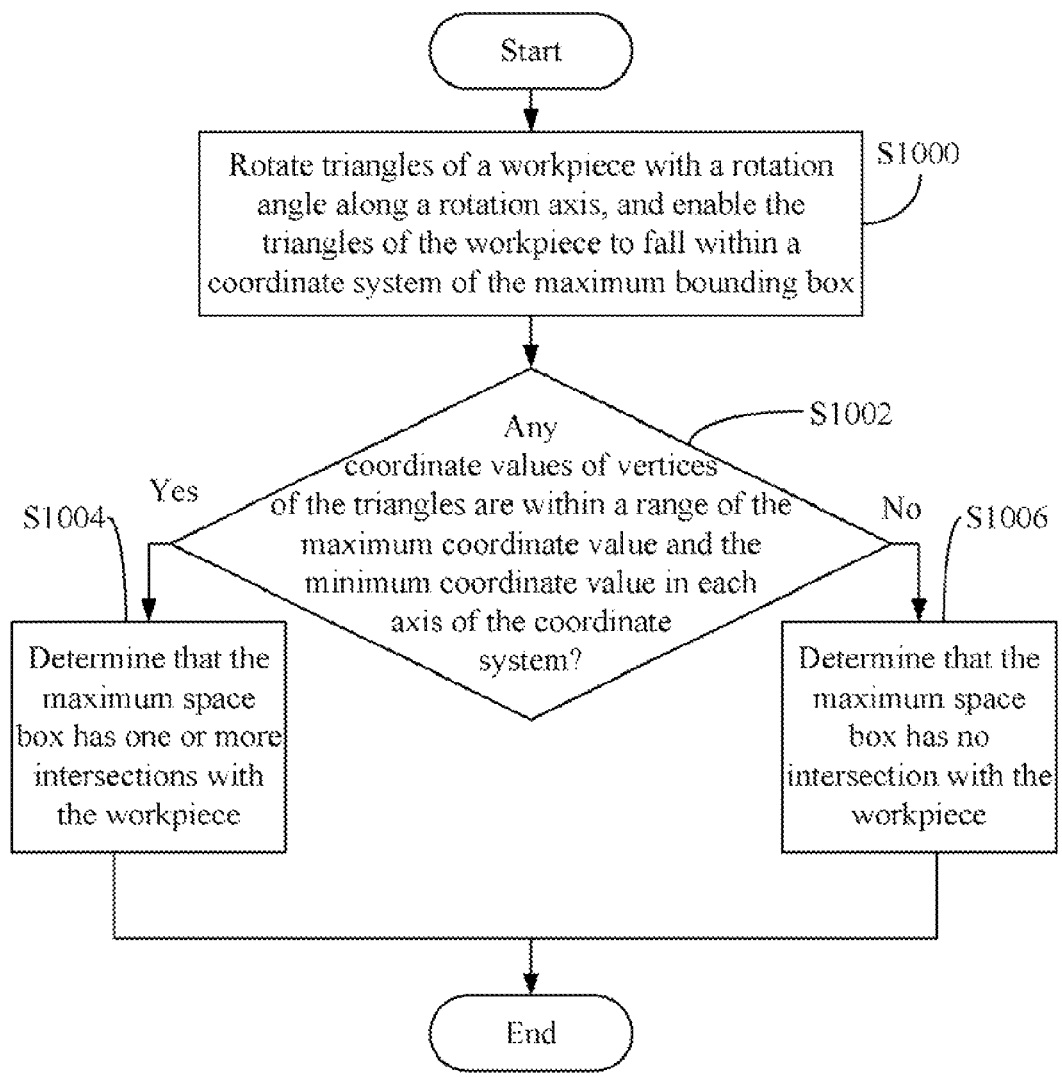
FIG. 10 is a detailed description of step S304 in FIG. 3, for determining whether the maximum space box has one or more intersections with triangles of a workpiece.

FIG. 10 is a detailed description of step S304 in FIG. 3, for determining whether the maximum space box has one or more intersections with triangles of the workpiece.

In step S1000, the determination module 14 rotates the triangles of the workpiece with a rotation angle along a rotation axis, and enables the triangles of the workpiece to fall within a coordinate system of the maximum bounding box. In the embodiment, the first measuring point is a start point of the rotation, a normal direction of the probe is the rotation axis, and an angle between an x-axis of the coordinate system and a line composed by the first measuring point and the second measuring point is the rotation angle.

In step S1002, the determination module 14 determines whether any coordinate values of vertices of the triangles after the rotation are within a range of the maximum coordinate value and the minimum coordinate value in each axis of the coordinate system. For example, the determination module 14 determines whether any x-coordinate values of the vertices are less than the maximum coordinate value, and greater than the minimum coordinate value.

Upon the condition that any coordinate value of the vertices of the triangles after the rotation are within the range in each axis of the coordinate system, in step S1004, the determination module 14 determines that the maximum space box has one or more intersections with the workpiece.

Upon the condition that no coordinate value of the vertices of the triangles after the rotation are within the range in each axis of the coordinate system, in step S1006, the determination module 14 determines that the maximum space box has no intersection with the workpiece.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented method for establishing a safety plane in coordinate measurements using an electronic device, the method comprising:

meshing a 3D model of a workpiece and a probe using a plurality of triangles, and outputting a record list comprising information and details of the plurality of triangles;

calculating a maximum bounding box of the probe according to the triangles of the probe, obtaining a moving path of the maximum bounding box after moving the maximum bounding box from a first measuring point to a second measuring point, and obtaining a maximum space box of the moving path based on coordinate values of the first measuring point and the second measuring point;

determining whether the maximum space box has one or more intersections with the workpiece by detecting whether any triangle of the workpiece falls within the maximum space box;

calculating a distance between vertices of each of the triangles falling within the maximum space box and a bottom face of the maximum space box, and obtaining a point in the bottom face of the maximum space box that has a maximum distance from the triangles; and obtaining a safety plane by correcting a plane containing the point according to a predetermined tolerance of the safety plane.

2. The method as described in claim 1, further comprising:

projecting the first measuring point and the second measuring point on the safety plane, obtaining a first projection point related to the first measuring point, and obtaining a second projection point related to the second measuring point;

simulating a measuring path of the probe based on the first measuring point, the second measuring point, the first projection point, and the second projection point; and displaying the measuring path on a display screen of the electronic device.

3. The method as described in claim 2, wherein the measuring path comprises a first line composed by the first measuring point and the first projection point, a second line composed by the first projection point and the second projection point, and a third line composed by the second projection point and the second measuring point.

4. The method as described in claim 1, wherein the meshing step comprises:

converting the 3D model into a B-spline curved surface, determining a closed boundary curve of the B-spline curved surface in a parametric plane, and dividing the closed boundary curve into a plurality of grids using a plurality of horizontal lines and vertical lines;

generating two triangles by connecting four vertices of the grid anti-clockwise, if one of the grids has no intersection point with the closed boundary curve;

generating a 2D data structure according to the one or more intersection points, one or more vertices of the grid which fall within the closed boundary curve and boundary points of the closed boundary line, if one of the grids has one or more intersection points with the closed boundary curve;

reading a first point and a second point nearest to the first point from the 2D data structure, constructing one side of a triangle using the first point and the second point, and determining a third point of the triangle according to a determination rule, wherein the determination rule represents that there is no 2D point of the 2D data structure in a circumcircle of the triangle; and generating the plurality of triangles of the 3D model by determining vertices of other triangles in the 2D data structure according to the determination rule.

5. The method as described in claim 1, wherein the calculating a maximum bounding box comprises:

finding a minimum coordinate value and a maximum coordinate value of the 3D model of the probe in each of an x-axis, a y-axis, and a z-axis of a coordinate system, and obtaining eight points comprising the minimum coordinate value and the maximum coordinate value;

creating a cube figure of the probe by connecting the eight points and determining that the cube figure is the maximum bounding box comprising eight vertices;

moving the maximum bounding box from the first measuring point to the second measuring point by considering the first measuring point as an origin point, and the positive direction of the x-axis as the moving direction;

obtaining coordinate values of the eight vertices after the motion;

calculating a moving path of the maximum bounding box based on the coordinate values of the eight vertices before and after the motion; and obtaining a maximum space box of the moving path according to the coordinate values of the eight vertices before and after the motion.

6. The method as described in claim 5, wherein the determining whether the maximum space box has one or more intersections with the workpiece comprises:

rotating the triangles of the workpiece with a rotation angle along a rotation axis, and enabling the triangles of the workpiece to fall within a coordinate system of the maximum bounding box, the first measuring point being a start point of the rotation, a normal direction of the probe being the rotation axis, and an angle between an x-axis of the coordinate system and a line composed by the first measuring point and the second measuring point being the rotation angle;

determining whether any coordinate values of vertices of the triangles after the rotation are within a range of the maximum coordinate value and the minimum coordinate value in each axis of the coordinate system;

determining that the maximum space box has one or more intersections with the workpiece, upon the condition that any coordinate values of the vertices of the triangles after the rotation are within the range in each axis of the coordinate system; or determining that the maximum space box has no intersection with the workpiece, upon the condition that no coordinate values of the vertices of the triangles after the rotation are within the range in each axis of the coordinate system.

7. An electronic device, comprising:
at least one processor;
a storage system; and
one or more modules that are stored in the storage system and executed by the at least one processor, the one or more modules comprising:

a meshing module that meshes a 3D model of a workpiece and a probe using a plurality of triangles, and outputs a record list comprising information and details of the plurality of triangles;

a box calculation module that calculates a maximum bounding box of the probe according to the triangles of the probe, obtains a moving path of the maximum bounding box after moving the maximum bounding box from a first measuring point to a second measuring point, and obtains a maximum space box of the moving path based on coordinate values of the first measuring point and the second measuring point;

a determination module that determines whether the maximum space box has one or more intersections with the workpiece by detecting whether any triangle of the workpiece falls within the maximum space box;

a distance calculation module that calculates a distance between vertices of each of the triangles falling within the maximum space box and a bottom face of the maximum space box, and obtains a point in the bottom face of the maximum space box that has a maximum distance from the triangles; and an establishing module that obtains a safety plane by correcting a plane containing the point according to a predetermined tolerance of the safety plane.

8. The electronic device as described in claim 7, further comprising:

a path simulation module that projects the first measuring point and the second measuring point on the safety plane, obtains a first projection point related to the first measuring point, obtains a second projection point related to the second measuring point, and simulates a measuring path of the probe based on the first measuring point, the second measuring point, the first projection point, and the second projection point; and an output module that displays the measuring path on a display screen of the electronic device.

9. The electronic device as described in claim 8, wherein the measuring path comprises a first line composed by the first measuring point and the first projection point, a second line composed by the first projection point and the second projection point, and a third line composed by the second projection point and the second measuring point.

10. The electronic device as described in claim 7, wherein the meshing module meshes the 3D model of the workpiece and the 3D model of the probe bys:

converting the 3D model into a B-spline curved surface, determining a closed boundary curve of the B-spline curved surface in a parametric plane, and dividing the closed boundary curve into a plurality of grids using a plurality of horizontal lines and vertical lines;

generating two triangles by connecting four vertices of the grid anti-clockwise, if one of the grids has no intersection point with the closed boundary curve;

generating a 2D data structure according to the one or more intersection points, one or more vertices of the grid which fall within the closed boundary curve and boundary points of the closed boundary line, if one of the grids has one or more intersection points with the closed boundary curve;

reading a first point and a second point nearest to the first point from the 2D data structure, constructing one side of a triangle using the first point and the second point, and determining a third point of the triangle according to a determination rule, wherein the determination rule represents that there is no 2D point of the 2D data structure in a circumcircle of the triangle; and generating the plurality of triangles of the 3D model by determining vertices of other triangles in the 2D data structure according to the determination rule.

11. The electronic device as described in claim 7, wherein the box calculation module obtains the maximum space box by:

finding a minimum coordinate value and a maximum coordinate value of the 3D model of the probe in each of an x-axis, a y-axis, and a z-axis of a coordinate system, and obtaining eight points comprising the minimum coordinate value and the maximum coordinate value;

creating a cube figure of the probe by connecting the eight points and determining that the cube figure is the maximum bounding box comprising eight vertices;

moving the maximum bounding box from the first measuring point to the second measuring point by considering the first measuring point as an origin point, and the positive direction of the x-axis as the moving direction;

obtaining coordinate values of the eight vertices after the motion;

calculating a moving path of the maximum bounding box based on the coordinate values of the eight vertices before and after the motion; and obtaining a maximum space box of the moving path according to the coordinate values of the eight vertices before and after the motion.

12. The electronic device as described in claim 11, wherein the determination module determines whether the maximum space box has one or more intersections with the triangles of the workpiece by:

rotating the triangles of the workpiece with a rotation angle along a rotation axis, and enabling the triangles of the workpiece to fall within a coordinate system of the maximum bounding box, the first measuring point being a start point of the rotation, a normal direction of the probe being the rotation axis, and an angle between an x-axis of the coordinate system and a line composed by the first measuring point and the second measuring point being the rotation angle;

determining whether any coordinate values of vertices of the triangles after the rotation are within a range of the maximum coordinate value and the minimum coordinate value in each axis of the coordinate system;

determining that the maximum space box has one or more intersections with the workpiece, upon the condition that any coordinate values of the vertices of the triangles after the rotation are within the range in each axis of the coordinate system; or determining that the maximum space box has no intersection with the workpiece, upon the condition that no coordinate values of the vertices of the triangles after the rotation are within the range in each axis of the coordinate system.

13. A non-transitory computer readable storage medium having stored thereon instructions that, when executed by a processor of an electronic device, causes the electronic device to perform a method for establishing a safety plane in coordinate measurements, the method comprising:

meshing a 3D model of a workpiece and a probe using a plurality of triangles, and outputting a record list comprising information and details of the plurality of triangles;

calculating a maximum bounding box of the probe according to the triangles of the probe, obtaining a moving path of the maximum bounding box after moving the maximum bounding box from a first measuring point to a second measuring point, and obtaining a maximum space box of the moving path based on coordinate values of the first measuring point and the second measuring point;

determining whether the maximum space box has one or more intersections with the workpiece by detecting whether any triangle of the workpiece falls within the maximum space box;

calculating a distance between vertices of each of the triangles falling within the maximum space box and a bottom face of the maximum space box, and obtaining a point in the bottom face of the maximum space box that has a maximum distance from the triangles; and obtaining a safety plane by correcting a plane containing the point according to a predetermined tolerance of the safety plane.

14. The storage medium as described in claim 13, wherein the method further comprises:

projecting the first measuring point and the second measuring point on the safety plane, obtaining a first projection point related to the first measuring point, and obtaining a second projection point related to the second measuring point;

simulating a measuring path of the probe based on the first measuring point, the second measuring point, the first projection point, and the second projection point; and displaying the measuring path on a display screen of the electronic device.

15. The storage medium as described in claim 14, wherein the measuring path comprises a first line composed by the first measuring point and the first projection point, a second line composed by the first projection point and the second projection point, and a third line composed by the second projection point and the second measuring point.

16. The storage medium as described in claim 13, wherein the meshing a 3D model of a workpiece and a 3D model of a probe using a plurality of triangles comprises:

converting the 3D model into a B-spline curved surface, determining a closed boundary curve of the B-spline curved surface in a parametric plane, and dividing the closed boundary curve into a plurality of grids using a plurality of horizontal lines and vertical lines;

generating two triangles by connecting four vertices of the grid, if one of the grids has no intersection point with the closed boundary curve;

generating a 2D data structure according to the one or more intersection points, one or more vertices of the grid which fall within the closed boundary curve and boundary points of the closed boundary line, if one of the grids has one or more intersection points with the closed boundary curve;

reading a first point and a second point nearest to the first point from the 2D data structure, constructing one side of a triangle using the first point and the second point, and determining a third point of the triangle according to a determination rule, wherein the determination rule represents that there is no 2D point of the 2D data structure in a circumcircle of the triangle; and generating the plurality of triangles of the 3D model by determining vertices of other triangles in the 2D data structure according to the determination rule.

17. The storage medium as described in claim 13, wherein the calculating bounding box comprises:

finding a minimum coordinate value and a maximum coordinate value of the 3D model of the probe in each of an x-axis, a y-axis, and a z-axis of a coordinate system, and obtaining eight points comprising the minimum coordinate value and the maximum coordinate value;

creating a cube figure of the probe by connecting the eight points and determining that the cube figure is the maximum bounding box comprising eight vertices;

moving the maximum bounding box from the first measuring point to the second measuring point by considering the first measuring point as an origin point, and the positive direction of the x-axis as the moving direction;

obtaining coordinate values of the eight vertices after the motion;

calculating a moving path of the maximum bounding box based on the coordinate values of the eight vertices before and after the motion; and obtaining a maximum space box of the moving path according to the coordinate values of the eight vertices before and after the motion.

18. The storage medium as described in claim 17, wherein the determining whether the maximum space box has one or more intersections with the workpiece comprises:

rotating the triangles of the workpiece with a rotation angle along a rotation axis, and enabling the triangles of the workpiece to fall within a coordinate system of the maximum bounding box, the first measuring point being a start point of the rotation, a normal direction of the probe being the rotation axis, and an angle between an x-axis of the coordinate system and a line composed by the first measuring point and the second measuring point being the rotation angle;

determining whether any coordinate values of vertices of the triangles after the rotation are within a range of the maximum coordinate value and the minimum coordinate value in each axis of the coordinate system;

determining that the maximum space box has one or more intersections with the workpiece, upon the condition that any coordinate values of the vertices of the triangles after the rotation are within the range in each axis of the coordinate system; or determining that the maximum space box has no intersection with the workpiece, upon the condition that no coordinate values of the vertices of the triangles after the rotation are within the range in each axis of the coordinate system.

* * * * *